United States Patent
Luo et al.

(10) Patent No.: US 6,804,237 B1
(45) Date of Patent: Oct. 12, 2004

(54) METHOD, DEVICES AND SIGNALS FOR MULTIPLEXING PAYLOAD DATA FOR TRANSPORT IN A DATA NETWORK

(75) Inventors: Gang Luo, Kanata (CA); Peter A. Giese, Kinburn (CA); Paul G. Davidson, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/338,531

(22) Filed: Jun. 23, 1999

(51) Int. Cl.⁷ .............................................. H04L 12/28
(52) U.S. Cl. ...................................... 370/392; 370/400
(58) Field of Search ................................ 370/368, 389, 370/400, 411, 423, 428, 471, 472, 473, 474, 395.6, 395.64, 395.65, 352–356, 392; 709/238

(56) References Cited

U.S. PATENT DOCUMENTS

| | | | |
|---|---|---|---|
| 5,638,374 A | 6/1997 | Heath | 370/322 |
| 6,072,771 A | 6/2000 | Anderson et al. | 370/216 |
| 6,101,182 A | 8/2000 | Sistanizadeh et al. | 370/352 |
| 6,119,171 A | 9/2000 | Alkhatib | 370/390 |
| 6,147,996 A | 11/2000 | Laor et al. | 370/394 |
| 6,157,635 A | 12/2000 | Wang et al. | 370/264 |
| 6,163,547 A * | 12/2000 | De Vriendt et al. | 370/466 |
| 6,173,333 B1 | 1/2001 | Jolitz et al. | 709/238 |
| 6,259,695 B1 | 7/2001 | Ofek | 370/389 |
| 6,272,148 B1 | 8/2001 | Takagi et al. | 370/469 |
| 6,341,131 B1 * | 1/2002 | Eneroth et al. | 370/395.61 |
| 6,366,961 B1 * | 4/2002 | Subbiah et al. | 709/238 |
| 6,434,151 B1 | 8/2002 | Caves et al. | 370/395.2 |
| 6,463,082 B2 * | 10/2002 | Bergenwall et al. | 370/535 |

* cited by examiner

Primary Examiner—Frank Duong
Assistant Examiner—Melanie Jagannathan (57) ABSTRACT

Data network signals, methods and devices that are suitable for multiplexing payload data in a packet switched data network are disclosed. Payload associated with multiple packets is multiplexed into a single multiplexed packet. Each payload portion is identified by a mini-header within the multiplexed packet. Mapping information may also be transferred as part of such multiplexed packets which include multiplexed payload data. Preferably, the mapping information is used to form mapping tables within routers at edges of access networks. The mapping tables may be used to establish a relationship between mini-headers and full headers. The mapping tables may be used to multiplex data from packets to form a multiplexed packet at an ingress router, and demultiplex the multiplexed packet at an egress router. Conveniently, neither gateways nor out of band signalling are required.

7 Claims, 11 Drawing Sheets

METHOD, DEVICES AND SIGNALS FOR MULTIPLEXING PAYLOAD DATA FOR TRANSPORT IN A DATA NETWORK

FIELD OF THE INVENTION

The present invention relates to data networks, and more particularly to data network signals, methods and devices that are suitable for multiplexing payload data in a packet switched data network.

BACKGROUND OF THE INVENTION

In recent years, packet switched data networks have become heavily used and relied upon. The best known of such networks use the known Internet protocol ("IP") as detailed in the Internet Engineering Task Force, Request for Comment ("RFC") 791, the contents of which are hereby incorporated by reference. Numerous protocols based on IP are used to carry a variety of payload data on IP compliant networks. These include the Uniform Datagram Protocol ("UDP") and the Real-Time Protocol ("RTP") as detailed in RFCs 768 and 1889, the contents of which are hereby incorporated by reference.

All of these protocols utilize headers to identify packets and attributes of packets transported across the network. Such headers introduce overhead. For example, common IP telephony techniques as detailed in International Telephony Union ("ITU") Recommendation H.323, the contents of which are hereby incorporated by reference, rely on the RTP to transport payload voice data. RTP in turn relies on the UDP and the IP. Each RTP/UDP/IP compliant voice packet typically includes a total of forty (40) bytes of overhead in the header.

By contrast, modern voice compression techniques compress voice payload to lower and lower bit rates. ITU Recommendation G.723.1, the contents of which are hereby incorporated by reference, for example, compresses voice data to 5.3 kbps. This results in voice data that is typically packetized every thirty (30) ms, with each packet having a payload of twenty (20) bytes. Thus, using the RTP may result in payload occupying only one-third of each packet, with the remaining two-thirds of the packet dedicated to protocol overhead. Other packet based protocols similarly often use only ten (10) to twenty (20) bytes of data.

It has been recognized that multiple voice streams are typically exchanged concurrently between two IP telephony gateways. Thus, voice payload for multiple streams may be combined or multiplexed within packets reducing the overhead to payload data ratio for each packet. Proposals based on such multiplexing include K. Tanigawa, T. Hoshi and K. Tsukada: A RTP simple multiplexing transfer method for Internet telephony gateway, IETF draft, work in progress June 1998; J. Rosenberg and H. Schulzrinne: An RTP payload format for user multiplexing, IETF draft, work in progress, Aug. 21, 1998; and Mark Handley (ISI), AVT group meeting minutes for August 1998 meeting.

These proposals suggest stripping existing RTP/UDP/IP headers at network gateways, mapping these to mini-headers included in multiplexed packets, and transferring the multiplexed packets including mini-headers in a single IP packet to a recipient gateway. In advance of transferring multiplexed packets, the relationship between RTP/UDP/IP headers and mini-headers is communicated between gateways, typically using out-of-band signalling. The recipient gateway replaces each received mini-header with an associated full RTP/UDP/IP header and passes the reconstructed RTP packets to computing devices on the far side of the recipient gateway.

These approaches rely on the presence of gateways, such as those defined in ITU Recommendation H.323. Moreover, they typically require modifications to control protocols to exchange mapping information between gateways. However, many IP telephony applications and similar low bit rate applications are end-to-end, and do not rely on gateways.

Accordingly, an improved method of multiplexing data within packets, and a protocol making use of such a method are desirable.

SUMMARY OF THE INVENTION

In accordance with the present invention, payload associated with multiple packets is multiplexed into a single multiplexed packet. Each payload portion is identified by a mini-header within the multiplexed packet. Advantageously, mapping information is also be transferred as part of such multiplexed packets which include multiplexed payload data. Preferably, the mapping information is used to form mapping tables within routers at edges of access networks. The mapping tables may be used to establish a relationship between mini-headers and full headers. The mapping tables may be used to multiplex data from packets to form a multiplexed packet at an ingress router, and demultiplex the multiplexed packet at an egress router. Conveniently, neither gateways nor out of band signalling are required.

In accordance with an aspect of the present invention, payload data contained in a plurality of packets to be passed by way of a network node within a packet switched data network, is multiplexed by associating with the payload portion of each packet a mini-header smaller than a header for the packet. A multiplexed packet including each payload portion and an associated mini-header, and further including a mapping token, which establishes a relationship between a mini-header and a header for one of the packets, for which this relationship is not known at the network node is constructed.

In accordance with another aspect of the invention, a mapping table may be formed at a network node within a packet switched network. The mapping table maps mini-headers identifying multiplexed payload data from several packets within a multiplexed packet, to complete headers usable to transport payload on the network. An entry of the mapping table may be formed by receiving a packet including at least one payload data portion from one of the packets; a mini-header associated with the payload data portion; and a mapping token, indicative of a relationship between the mini-header and a complete header for transporting the data portion on the network. The formed entry within the table, includes a portion of the mini-header and information derived from the mapping token, indicative of the a relationship between the mini-header and the complete header.

In accordance with another aspect of the invention, a computer data signal embodied in a carrier wave includes at least one payload data portion from a packet transportable within the packet switched data network. The data signal further includes a mini header associated with the payload data portion; and a mapping token, indicative of a relationship between the mini-header and the complete header for routing the packet on the network.

In accordance with yet a further aspect of the invention, a computing apparatus interconnected with a packet switched data network, includes computer readable memory that stores a mapping table for mapping mini-headers identifying multiplexed payload data from several packets within a multiplexed packet to a complete header usable within the packet switched data network. As well, the computer readable memory stores computer readable instructions, that adapt the apparatus to process multiplexed packets including, payload portions; mini-headers associated with each payload portion, usable in conjunction with the mapping table to construct a packet including the associated payload that may be transported on the packet switched data network; and at least one mapping token, usable by the apparatus to update the mapping table. Preferably the computing apparatus includes a router on the network.

In accordance with another aspect of the invention, a computer readable memory stores computer executable instructions, that may be executed by a computing device interconnected with a packet switched network. The computer readable instructions adapt a computing device to maintain a mapping table for mapping mini-headers identifying multiplexed payload data from several packets within a multiplexed packet to a complete header usable within the network. Moreover, they adapt the computing device to process a multiplexed packet which includes a payload portion, formed from a packet transported on the network; a mapping header associated with the payload portion within the multiplexed packet and usable by the computing device in conjunction with the mapping table to construct a packet including the associated payload that may be transported on the network; and mapping information, usable by the device to update the mapping table.

In accordance with yet another embodiment of the invention, payload data contained in a plurality of packets to be passed by way of a network node in a switched packet network, is multiplexed, by searching a table with information in a header of each packet for a match. If a match for a given packet is not found, information from its header is entered in the table in association with information for a mini-header. A mapping token associating the given header information with the mini-header is also created. The payload portion of the packet is extracted and the header is discarded. The mini-header is associated with the payload portion, and a multiplexed packet including the mapping token is constructed.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures, which illustrate by way of example only, embodiments of the present invention.

DETAILED DESCRIPTION

Figure 1:
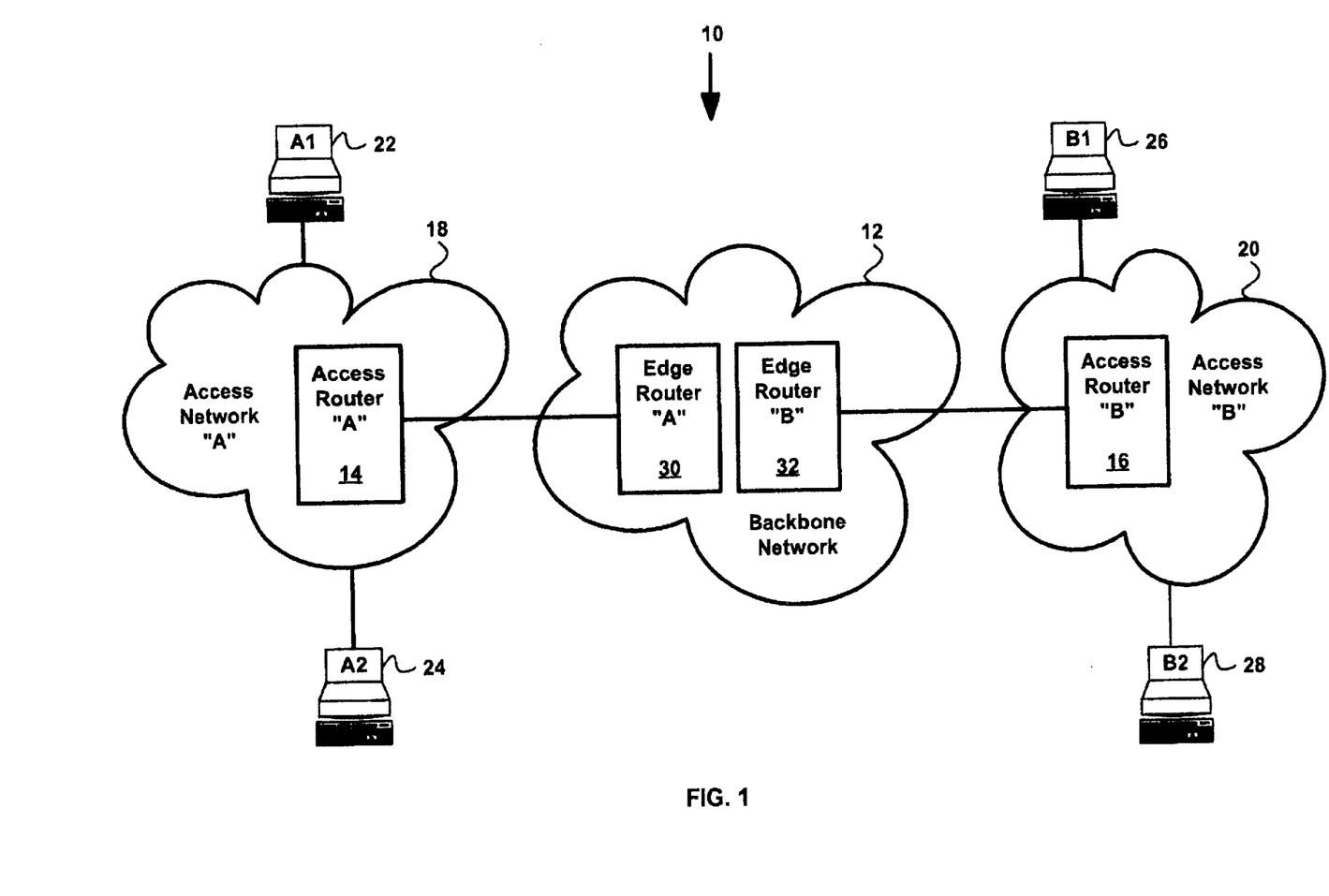
FIG. 1 illustrates a computing network, including routers exemplary of embodiments of the present invention.

FIG. 1 illustrates a packet switched data network 10, including a backbone network 12, in communication with access networks "A" and "B" 18 and 20, by way of access routers "A" and "B" 14 and 16, exemplary of embodiments of the present invention. Example computing devices A1 and A2 22 and 24 are in communication with access network "A" 18; similarly example computing devices B1 and B2 26 and 28 are in communication with access network "B" 20.

Computing devices 22, 24, 26, 28 may be general purpose computing devices including a processor, memory and network interface (all not illustrated). The memory may store software including operating system software and application software, which in turn may include an IP stack. The application software may include ITU Recommendation H.323 compliant client software, allowing computing devices 22, 24, 26 and 28 to establish end-to-end voice over IP telephony sessions with each other.

Backbone network 12 is preferably an IP compliant data network in accordance with RFC 791, including conventional packet routers 30 and 32. Backbone network 12 could, for example, be the public Internet. Access networks "A" and "B" 18 and 20 are similarly IP compliant data networks. These may be corporate intranets, or simply portions of the public Internet. Access routers "A" and "B" 14 and 16 interconnect access networks "A" and "B" 18 and 20 with backbone network 12, respectively. As illustrated, access routers 14 and 16 are in direct communication with routers 30 and 32 of backbone network 12. Routers 14, 16, 30 and 32 are thus nodes within network 10. Access routers "A" and "B" 14 and 16 may, for example, be conventional Nortel Networks Passport™ switches/routers adapted to function in manners exemplary of the present invention.

As will become apparent, access routers "A" and "B" 14 and 16 switch packets received from the remainder of access network "A" and "B" to backbone network 12. Similarly, access routers 14 and 16 switch packets received from backbone network 12 to access networks "A" and "B". As well, access routers "A" and "B" 14 and 16 multiplex, and optionally demultiplex, suitable packets in manners exemplary of the present invention.

Figure 2:
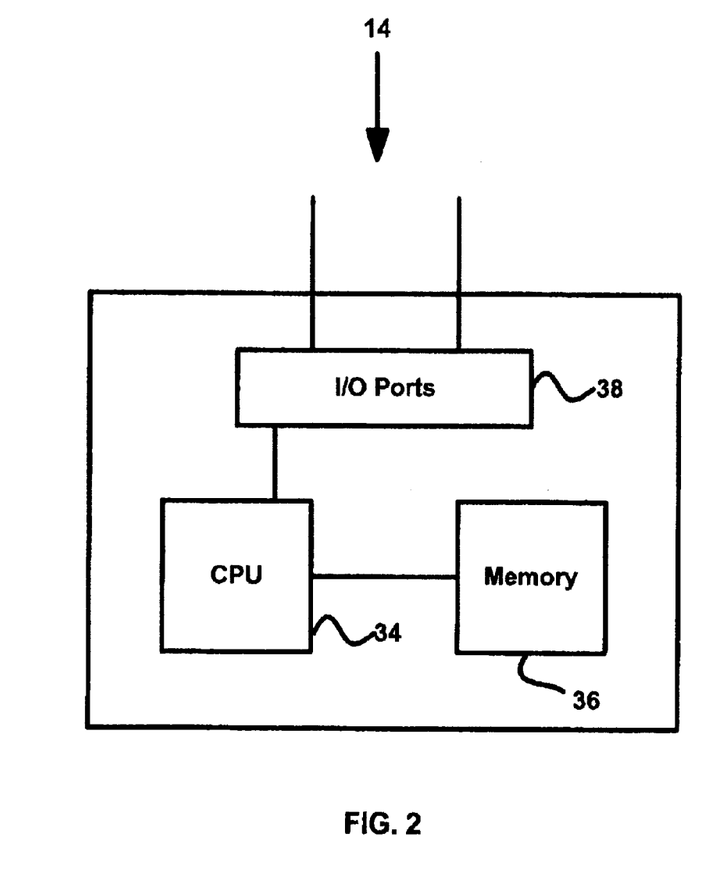
FIG. 2 is a block diagram of an exemplary architecture of routers of FIG. 1.

An example hardware architecture of access router "A" 14 is illustrated in block diagram in FIG. 2. The architecture of routers 16, 30 and 32 may be substantially similar to that of access router "A" 14. As illustrated in FIGS. 1 and 2, access router "A" may include a processor 34, in communication with storage memory 36 and a plurality of input/output ("I/O") ports 38. I/O ports 38 interconnect router 14 with the remainder of access network "A" and with routers of backbone network 12 (FIG. 1). I/O ports may be conventional DS1; OC-3; Ethernet or other suitable interfaces. Storage memory 36 may be any suitable combination of random access memory; disk memory; read-only memory; or any other suitable computing memory known to those of ordinary skill in the art. Processor 34, in turn, may be a conventional microprocessor such as an INTEL x86 processor or a Motorola MC68xxxx processor. Of course any other suitable processor may be used as part of router "A" 14.

Figure 3:
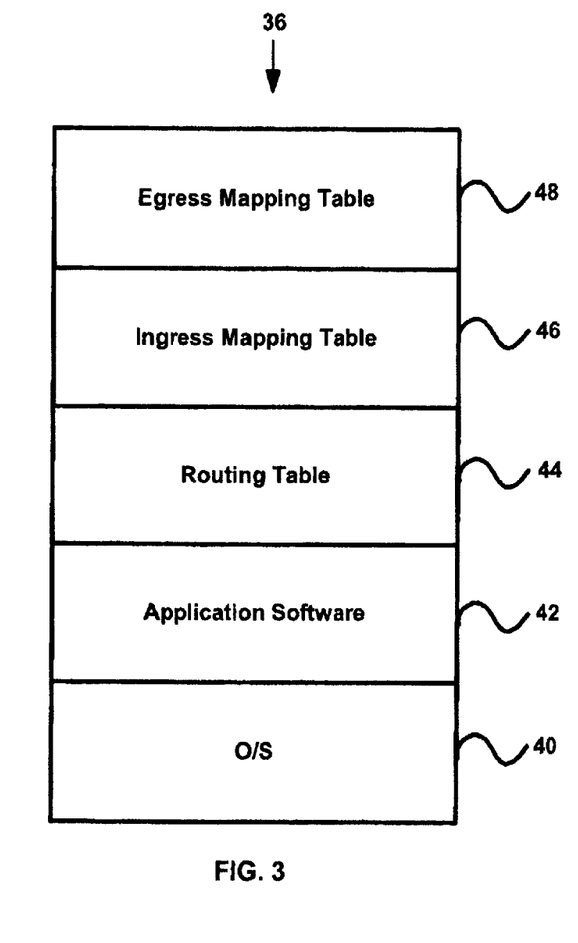
FIG. 3 is a block diagram of an exemplary memory organization of routers of FIG. 1.

An example organization of memory 36 is illustrated in FIG. 3. As illustrated, memory 36 stores an operating system 40; application software 42; a routing table 44; an ingress mapping table 46; and an egress mapping table 48. Operating system 40 in combination with application software 42 allow access router "A" 14 to route packets in a conventional manner, as well as perform in accordance with methods exemplary of the present invention.

Routing table 44 is formed by application software 42, and allows router 14 to route packets from one of I/O ports 38 to another based on a packet's destination address. Routing table 44 may, for example, be formed at router "A" 14 using the OSPF routing protocol, as detailed in RFC 2328, the content of which are hereby incorporated by reference, implemented by a portion of application software 42. Ingress mapping table 46 and egress mapping table 48 are also formed by application software 42 in manners exemplary of the present invention, and as detailed below.

Figure 4:
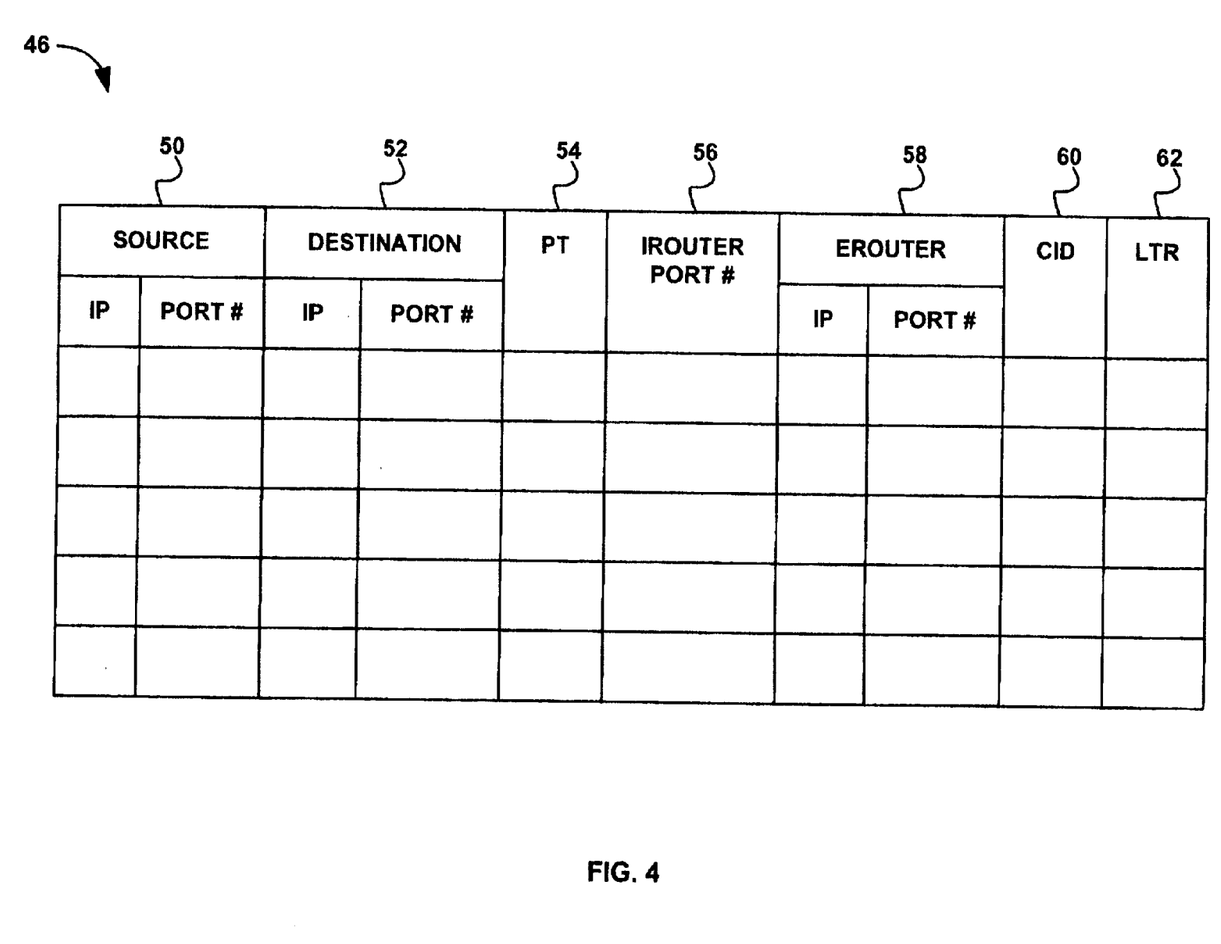
FIG. 4 illustrates an example ingress mapping table formed at a router of FIG. 1.

Ingress mapping table 46 establishes a one-to-one mapping of source IP address, destination IP address, and ports to mini-headers, to allow multiplexing of suitable packets originating with access network "A" 18, prior to entering backbone network 12. That is, the payload of any packet of suitable length originating with a particular source IP address within access network "A" destined for a particular destination address is associated with a mini-header. An organization of ingress mapping table 46 is illustrated in FIG. 4. As illustrated, along with each IP source address to destination address (including logical port number), as stored in fields 50 and 52 of ingress mapping table 46, a payload type ("PT") field 54; an ingress router port number ("IRouter Port#") field 56; and egress router ("ERouter") IP address and port number field 58; a channed identifier ("CID") field 60; and a last-time refreshed ("LTR") field 62 are stored within ingress mapping table 46. As should be appreciated, each IP source address to destination address (including logical port number), as stored in fields 50 and 52 may correspond to a single IP telephony connection across network 10. This connection is thus associated with a channel identifier stored in field 60.

Figure 5:
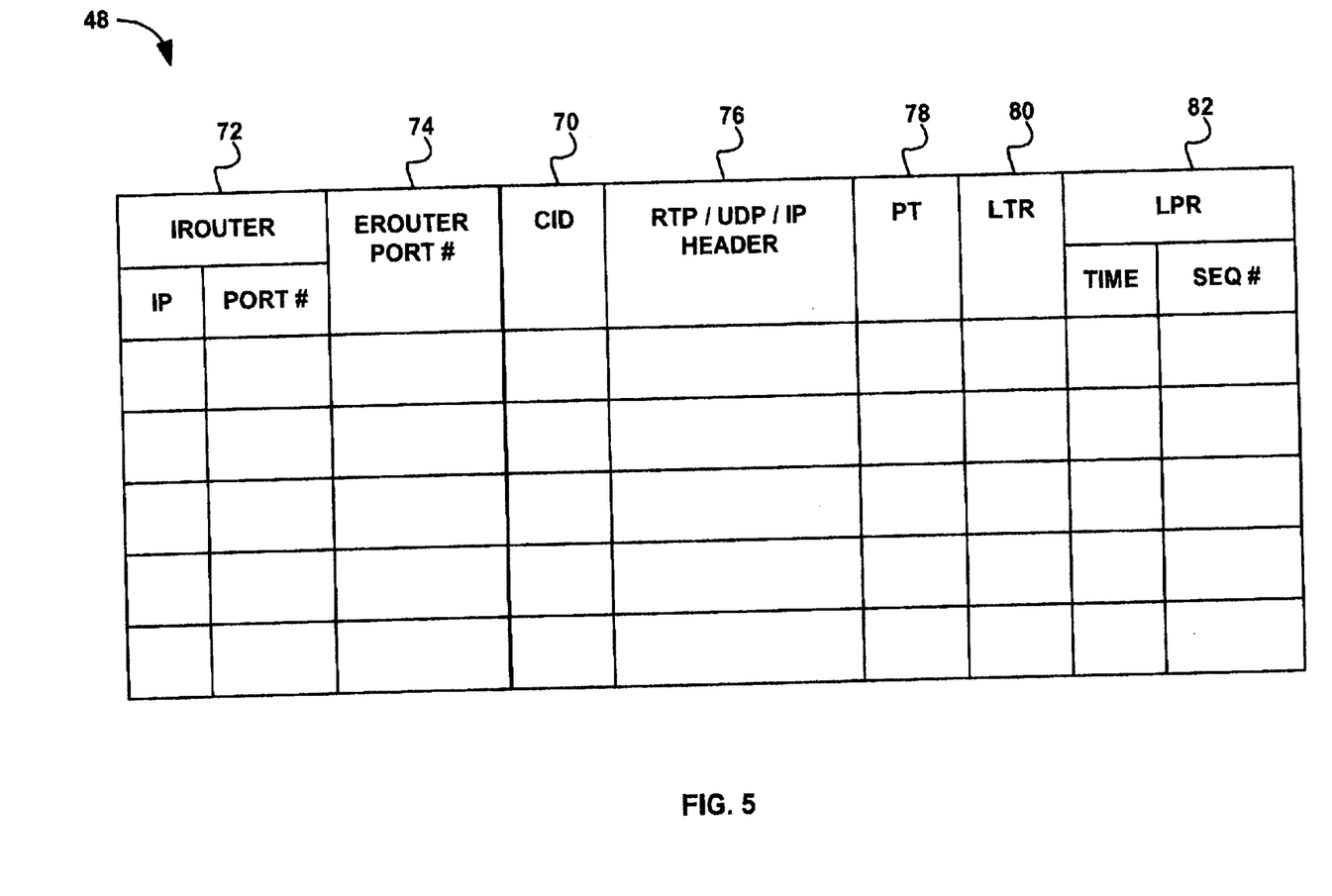
FIG. 5 illustrates an example egress mapping table formed at a router of FIG. 1.

An example organization of egress mapping table 48 is illustrated in FIG. 5. Egress mapping table 48 similarly establishes a one-to-one mapping of mini-headers to source IP address; destination IP address and ports, to demultiplex multiplexed packets received at router "A", exiting from backbone network 12. As illustrated, for each channel ID field 70, egress mapping table 48 stores an ingress router IP address and port number in field 72; an egress router port number in field 74; a full RTP/UDP/IP header in field 76; a payload type in field 78; a last time refreshed in field 80; and a last packet reproduced timestamp and sequence number in field 82.

Router "B" 16 acting as an egress or ingress router similarly forms egress and ingress mapping tables of the form of ingress an egress mapping tables 46 and 48. Conventional routers 30 and 32 will typically not form similar egress and ingress mapping tables.

Figure 6:
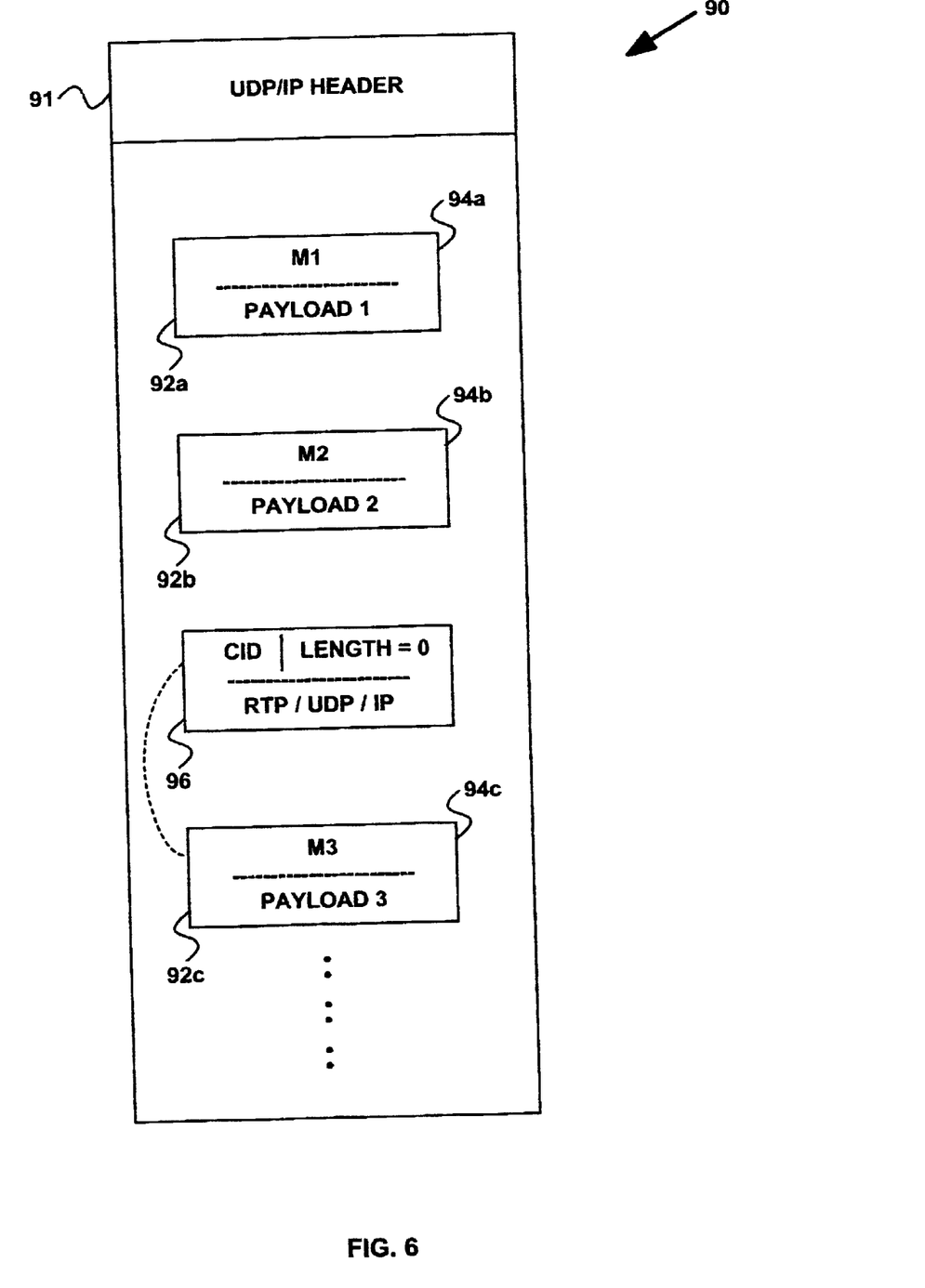
FIG. 6 illustrates an exemplary format of a multiplexed packet.

Router "A" 14 acting as an ingress router forms IP packets containing payload data associated with multiple RTP packets, to form multiplexed packets having the format of multiplexed packet 90 as illustrated in FIG. 6. As illustrated, a multiplexed packet 90 includes a conventional UPD/IP header 91 followed by a plurality of payload portions 92a, 92b and 92c, each associated with a mini-header 94a, 94b and 94c. Each mini-header/payload portion may be considered a channel within multiplexed packet 90. Further, some mini-header/payload combinations such as mini-header/ payload of fields 92c and 94c may further be associated with a mapping establishment token 96. It will be appreciated that multiplexed packet 90 may have significantly more or less than three multiplexed payload fields, as illustrated.

Figure 7:
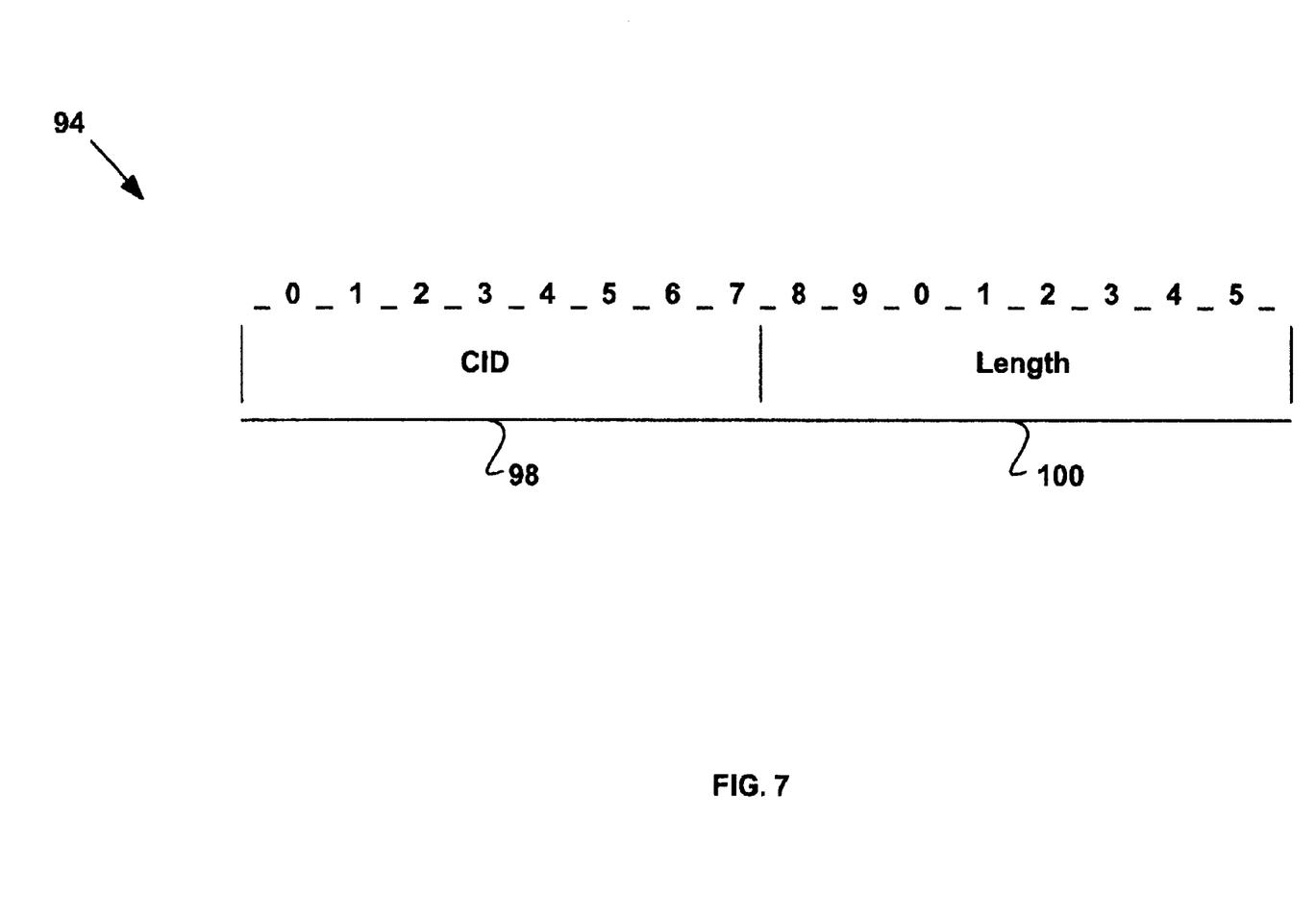
FIG. 7 illustrates an example format of a mini-header used in the packet of FIG. 6.

The format of each mini-header 94a, 94b and 94c (collectively and individual mini-header 94) is illustrated in FIG. 7. As illustrated each mini-header preferably includes an eight bit channel identifier field 98 and a further eight bit payload length field 100. Optionally, each mini-header 94 may additionally include an RTP time stamp and sequence number taken from the original RTP/UDP/IP header associated with the payload data.

Figure 8:
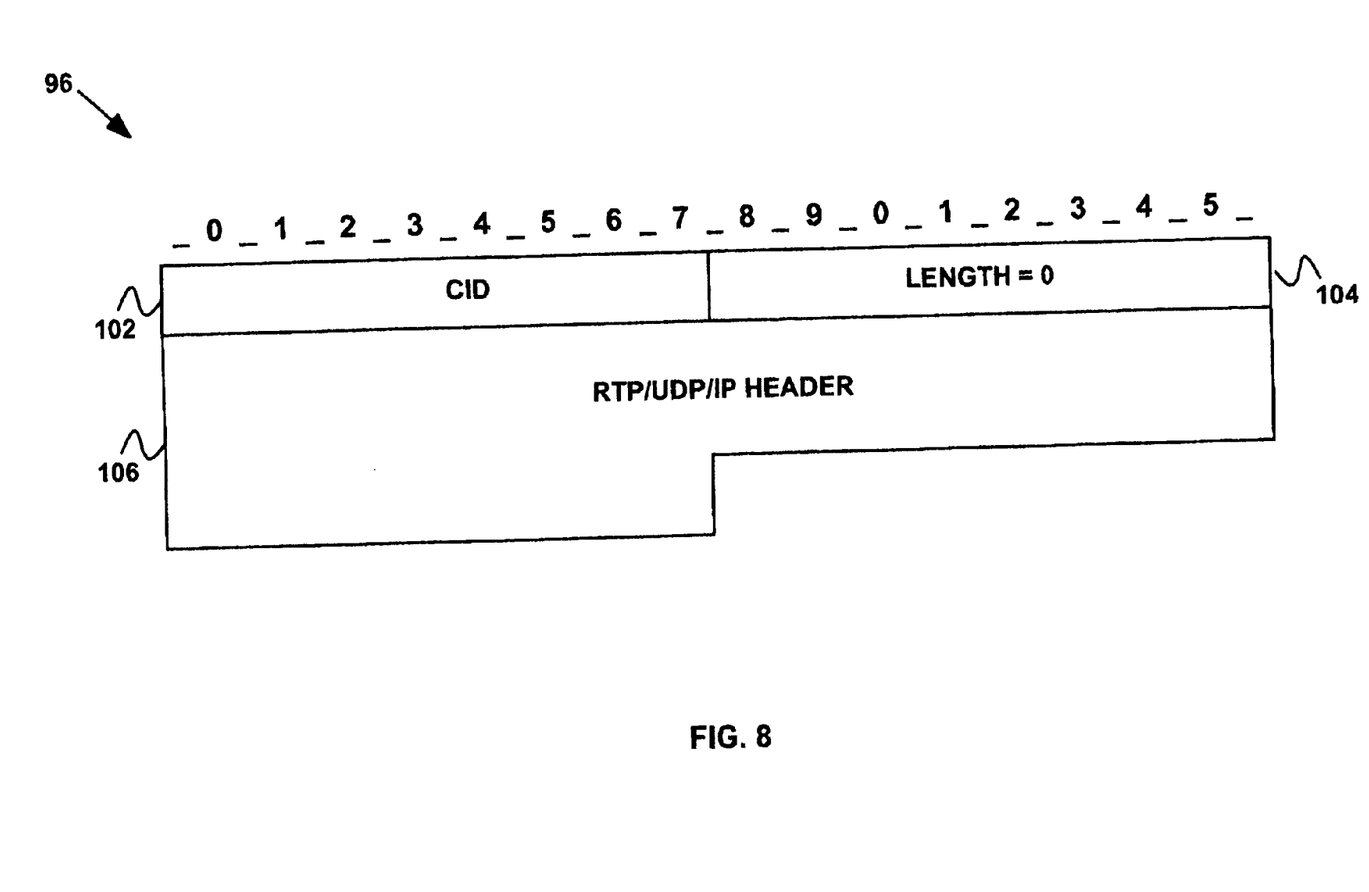
FIG. 8 illustrates an example format of a mapping establishment token used in the packet of FIG. 6.

The format of each mapping establishment token is illustrated in FIG. 8. As illustrated, each mapping establishment token includes an channel identifier field 102; a payload length field, indicating a length of zero (0) 104; and a full RTP/UDP/IP header in field 106.

In operation, a computing device, such as computing device A1 22 on access network "A" 18 illustrated in FIG. 1 wishes to exchange packets each having a relatively small payload with a computing device B1 26 on access network "B" 20. For example, computing device A1 22 may include an Internet telephony application that is compliant with H323. As such, computing device A1 22 may form packets having a payload of twenty (20) bytes with an associated RTP/UDP/IP header. The RTP/UDP/IP header identifies computing device B1 26 on access network "B" 20, as well as an appropriate logical port of device B1 26. At the same time, computing device A2 24 may wish to exchange similar small payload packets with computing device B2 28.

Figure 9:
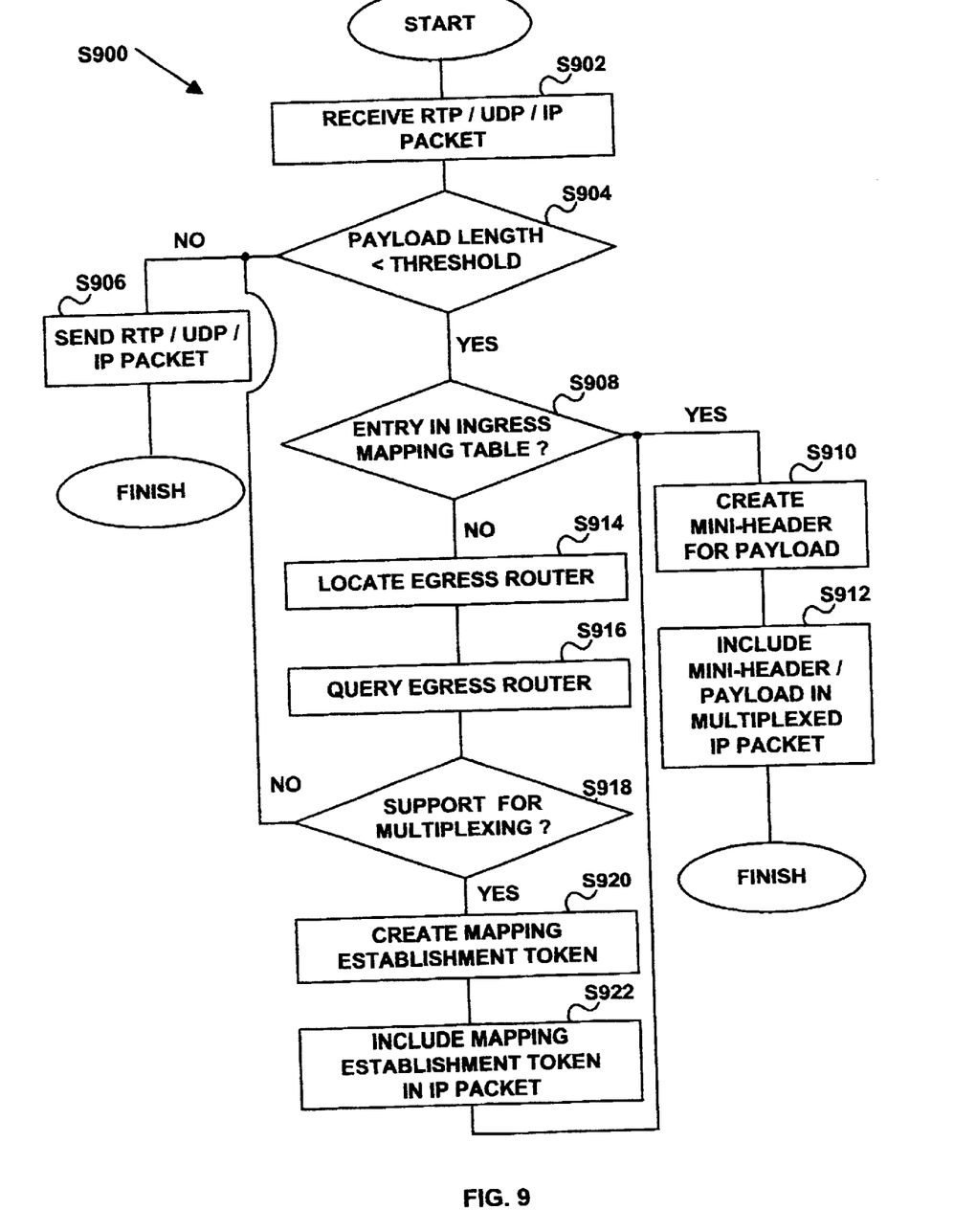
FIG. 9 is a flow chart of steps performed at an ingress router.

Consequently, RTP/UDP/IP compliant packets originating with devices A1 and A2 22 and 24, identifying devices B1 and B2 26 and 28 are forwarded to access router "A" 14, which acts as an ingress router to backbone network 12. The steps S900 performed by access router "A" 14 under control of software 42 may be better understood with reference to FIG. 9. Specifically, access router "A" 14 receives an RTP/UDP/IP packet in step S902 and determines if the received packet has "small" payload by, for example, examining the RTP/UDP/IP header associated with the received packet in step 8904. In the preferred embodiment only payload data associated with packets having less than 256 bytes of payload will be multiplexed. However, packets with smaller or larger payload could be multiplexed. If the received packet is above this threshold size, it is passed to backbone network 12 in step S906, without being multiplexed or otherwise modified.

Next, for a "small" payload packet, access router "A" 14 examines source and destination packet addresses and ports for the RTP/UDP/IP packet, and ingress mapping table 46 stored in memory 36 in step S906. If any of the entries in fields 50 and 52 of ingress mapping table 46 (FIG. 4) correspond to the source and destination addresses and ports of the RTP/UDP/IP header, access router 14 associates the channel number within field 60 to form a mini-header associated with the RTP/UDP/IP payload having the format of mini-header 94 of FIG. 7, in step S910. Length field 100 is filled with the payload length of the RDP/UDP/IP packet derived from this RDP/UDP/IP header. Access router "A" 14 determines an IP address and port of a destination egress router for the payload data from field 58. In the preferred embodiment, multiplexed packets destined for a particular egress router will be destined for a unique IP address and port at the egress router, dedicated to the receipt of multiplexed packets and stored within field 58. Router "A" then forms a multiplexed packet destined for the destination egress router including the formed mini-header/payload combination. Access router "A" 14 also discards the full RTP/UDP/IP header associated with the payload. Preferably, access router "A" 14 will buffer each multiplexed packet for at least five milliseconds, and preferably no more than ten milliseconds. However, it may buffer the multiplexed packet for more or less time. An ideal buffer time may be experimentally determined. Alternatively, if a multiplexed packet destined for the identified egress router is already buffered, router "A" may append the formed mini-header/payload combination to an already buffered packet. If within the buffering interval, additional RTP/UDP/IP packets arrive, such as a packet from computing device A2 24, and a similar mini-header is formed, destined for the same egress router, access router "A" 14 forms a multiplexed packet as illustrated in FIG. 6, containing the first and subsequent mini-headers and payload.

The multiplexed packet is then forwarded to router 30 of backbone network 12, in a conventional manner, and is then eventually routed to its destination by way of router 32 and access router "B" 16 to an associated logical port. Router "B" uses it egress table 48 including channel ID entries to reconstitute a full header, as explained more fully below.

If, on the other hand, table 46 of access router "A" acting as an ingress router does not contain an entry corresponding to a received RTP/UDP/IP header received from computing device A1 22, access router "A" 14 initiates a query to an access router, such as access router "B" 16, associated with the RTP/UDP/IP destination address to determine whether the egress router supports a multiplexing protocol in steps S914 and S916 The query may be initiated by way of UDP message to router "B" 16, or in any other way known to those of ordinary skill in the art. As will be appreciated by those of ordinary skill, a destination access router "B" 16 associated with a destination IP address may be identified in step S914 at access router "A" using routing table 44.

If access router "B" does not respond to the query, or responds negatively as determined in step S918, the RTP/UDP/IP packet is dispatched from access router "A" 14 in a conventional manner, as in step S906, without multiplexing or modification. If access router "B" 16 responds affirmatively, access router "A" creates a new entry in table 46 associated with the source and destination IP address pair and assigns a new channel ID in field 60 to the source/destination pair in step S920. Next, access router "A" 14 forms a mapping establishment token having the format of token 102, in FIG. 8 including the assigned channel ID and RTP/UDP/IP header of the received packet. Thereafter, the mapping establishment token, is included in the multiplexed packet in step S922. Next, access router "A" forms a mini-header for the payload data, as illustrated in FIG. 7 in step S910 and includes the mini-header/payload for the received packet in the multiplexed packet, as in step S910. Preferably, the mapping establishment token precedes the mini-header/payload combination within the multiplexed packet as illustrated in FIG. 6. Within a multiplexed packet 90, a mapping establishment token can be distinguished from a mini-header by way of the contents of length field 104. For a mapping establishment token 96, length field 104 will indicate a length of zero (0). For a mini-header, having the format of mini-header 94, the equivalent field 100 will indicate a non-zero length. Alternatively, the length of the CID field of mini header 94 could be reduced to seven bits, allowing the last bit to be used to identify a mapping token.

At the end of the buffer interval for the multiplexed packet, the multiplexed packet is dispatched by access router "A" 14 in a conventional manner. As should be apparent, the UDP/IP header 91 of the multiplexed packet identifies access router "A" as its source, and access router "B" as its destination. The multiplexed packet is routed across backbone network 12 to its eventual destination address identifying router "B" 16.

Conveniently, then, with a proper choice of a buffering interval, payload associated with multiple RTP/UDP/IP packets associated with multiple IP connections between access network "A" and access network "B" will be combined and multiplexed in each multiplexed packet. Moreover, as mapping establishment tokens are contained within the multiplexed packets, no out of band signalling is required. As such, this multiplexing is compatible with existing protocols, such as those defined by ITU Recommendation H.323, without any required modification.

Figure 10:
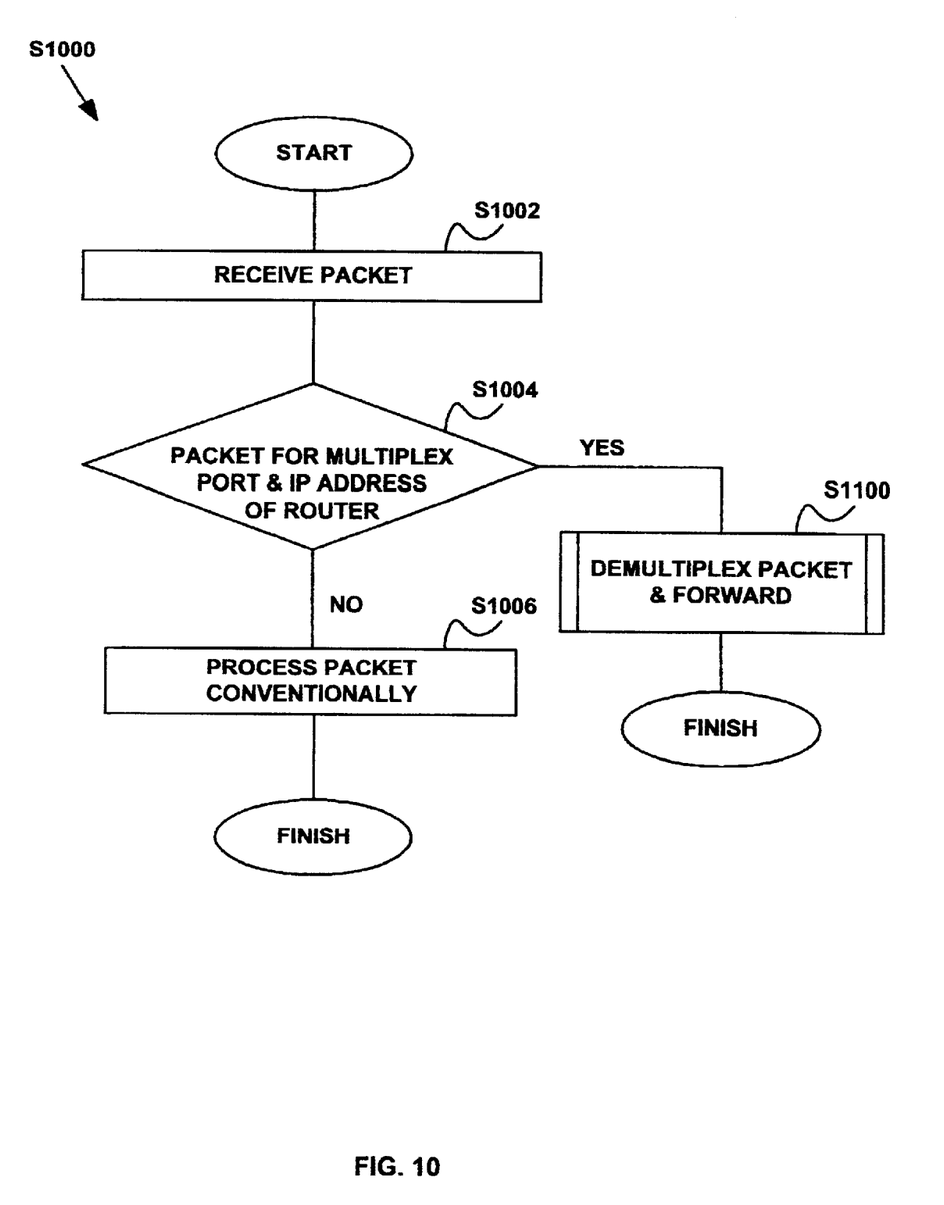
FIGS. 10 and 11 illustrate steps performed at an egress router.
Figure 11:
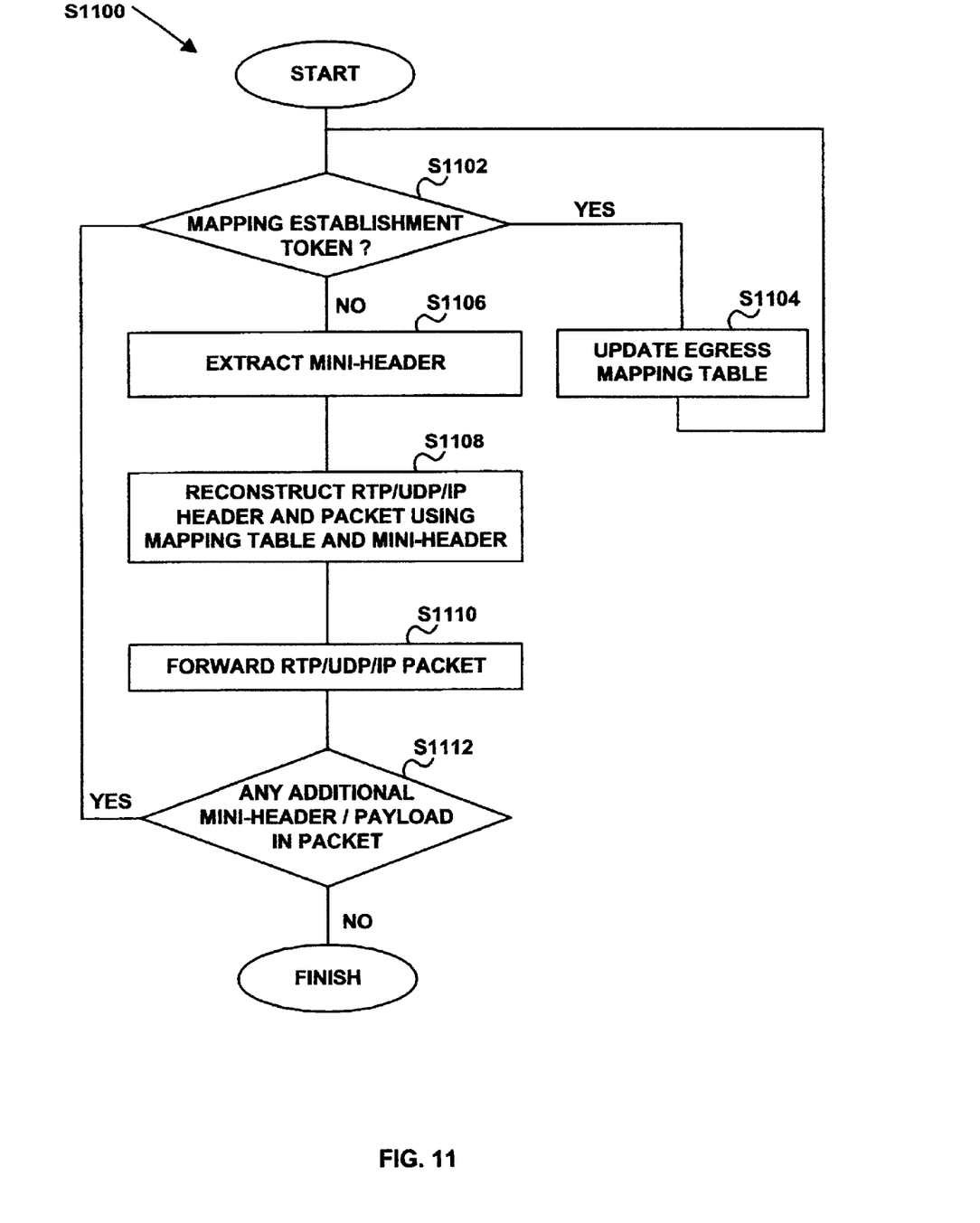

Steps S1000 and S1100 performed by access router "B" 16 upon receipt of a packet, including a multiplexed packet originating with access router "A" 14, may be better understood with reference to FIGS. 10 and 11. That is, router "B" upon receipt of any packet in step S1002 determines if it is directed to the known logical port and IP address reserved for multiplexed packets in step S1004. If not, the packet is processed in a conventional manner in step S1006. That is, the packet may be passed to a further network interconnected device without additional processing at access router "B" 16.

If the packet identifies the IP address and port reserved for multiplexed packets, router "B" demultiplexes the received packet in accordance with steps S1100 illustrated in FIG. 11. That is, router "B" 16 sequentially examines the contents of the received packet having the format of packet 90 to locate a mini-header 94 or a mapping establishment token 96. If router "B" initially locates a mapping establishment token in step S1102, it uses the contents of this header to update the contents of its egress mapping table, having the format of egress mapping table 48, as illustrated in FIG. 5 That is, as it encounters mapping establishment token, it creates a new entry within its egress mapping table including the RTP/UDP/IP header. The channel ID field 102 of the mapping establishment token may be used to complete field 70 of this entry. The contents of the RTP/UDP/IP header may be used to complete the payload type field 78; ingress router IP address and port field 72; and RTP/UDP/IP header field 76 of the entry. As will be appreciated, the next RTP/UDP/IP packet associated with the recently stored mini-header may now be identified using the channel ID now stored at access routers "A" and "B" 14 and 16.

Once a mini-header is encountered within the received packet, access router "B" 16 under control of application software 42 extracts the mini-header in step S1106 to associate a full RTP/UDP/IP header, as stored in field 76 of egress mapping table 48 with each payload portion of the multiplexed packet, to reconstruct a full RTP/UDP/IP packet.

If the mini-header includes a timestamp and sequence number, these are used to reconstruct the RTP/UDP/IP sequence number and timestamp. Alternatively, the contents of field 82 may be used to reconstruct suitable sequence numbers and timestamps. Specifically, upon creation of an entry reflective of a particular source and destination IP address pair, field 82 may be filled using the sequence number and time stamps of the received RTP/UDP/IP header. Thereafter, field 82 may be incremented appropriately each time a mini header associated with the same channel ID is received. The timestamp may be incremented using the local timer of router "B" 16.

The resulting reconstructed RTP/UDP/IP packet is then forwarded by router "B" 16 to a proper destination computing device, such as devices B1 and B2 26 and 28 interconnected with access network "B", in step S1112. Steps S1102 and onward are repeated until the entire packet is processed.

As mapping establishment tokens are included in packets in advance of mini-headers defined by the tokens, mini-headers for which an entry does not exist within egress mapping 48 should not be encountered. However, if a packet including a mini-header for which an entry does not exist is encountered, the mini-header and associated data is discarded. Moreover, full RTP/UDP/IP headers need not be sent once suitable mapping table entries are established.

Conveniently, access routers "A" and "B" 14 and 16 may also update the last time refreshed ("LTR") field 80,62 of egress mapping table 48, and ingress mapping table 46 any time a defined channel identifier is re-used. As well, periodically, at pre-determined intervals routers "A" and "B" may "flush" ingress and egress tables, deleting any entries that have not been used for a defined period, as determined with reference to the last time refresh field 62 and 80. This way, assigned channel identification numbers may be reused. This is particularly convenient as only eight bits are assigned to the channel identification header. Unique channel identification numbers may thus be re-used over time. In the context of IP telephony, and with an appropriate choice of to refresh intervals, ingress and egress mapping tables may thus be representative of established and active calls.

While in the above described embodiment, multiplexing and demultiplexing are performed at access routers "A" 14 and access router "B" 16, a person skilled in the art will appreciate that such multiplexing and demultiplexing, and maintenance of mapping tables could easily be performed at other network nodes, preferably at the "edge" of access networks "A" and "B". For example, routers 30 and 32 could be used to multiplex and demultiplex multiplexed packets. Moreover, while the invention is particularly well suited for use with IP telephony data, it will be appreciated that the invention may be used in association with other types of data, and will typically provide benefits when overhead to payload ratio is large. The network with which it may be used, need not conform to the IP, but may conform to successors of this protocol or some other packet switched protocol.

While the organization of software blocks, steps, payload data and header structures have been illustrated as clearly delineated, a person skilled in the art will appreciate that the delineation between blocks and structures is somewhat arbitrary. For example, software used to route, multiplex and demultiplex could be formed in hardware. Numerous other arrangements of software blocks and structures are possible.

Finally, it will be understood that the described embodiments are intended to be illustrative, and in no way limiting. The embodiment are susceptible to modification of form, arrangement of parts, steps, details and order of operation. The invention, rather, is intended to encompass all such modifications within its scope, as defined by the claims.

What is claimed is:

1. A method of forming a mapping table at a network node within a packet switched network, said mapping table for mapping mini-headers identifying multiplexed payload data from several packets within a multiplexed packet, to complete headers usable to transport payload on said network, said method comprising:

receiving a packet comprising:
   at least one payload data portion from one of said packets;
   a mini-header associated with said at least one payload data portion;
   a mapping token, indicative of a relationship between said mini-header
   and a complete header for transporting said at least one data portion on
   said network, said relationship allowing routing information for routing
   said at least one data portion to be formed based on said mini-header, forming a new entry within said table, including a portion of said mini-header and information derived from said mapping token, indicative of a relationship between said mini-header and said complete header.

2. The method of claim 1, wherein said mini-header comprises a channel identifier, identifying a logical channel within said multiplexed packet.

3. The method of claim 2, wherein said channel identifier is stored within said mapping table.

4. The method of claim 1, wherein said network node comprises a router on said packet switched data network.

5. The method of claim 1 wherein said mapping table is updated each time a mini-header including an already defined channel identifier is received, indicating network communication associated with said logical channel is active.

6. The method of claim 5, further comprising deleting an entry for which a mini-header including an already defined channel identifier is not received for a defined interval.

7. A method of multiplexing payload data contained in a plurality of packets to be passed by way of a network node in a switched packet network, comprising:

for each packet to be passed by way of said network node, searching a table with information in a header of said each packet for a match;
   on not finding a match for a given packet having a given header, entering information from said given header in said table in association with information for a mini-header;
   crating a mapping token associating said given header information with said mini-header;
   extracting a payload portion of said given packet, discarding said given header and associating said mini-header with said payload portion;
   constructing a multiplexed packet comprising said mapping token, said payload portion and said associated mini-header.

* * * * *